United States Patent [19]

Whitehurst et al.

[11] Patent Number: 4,969,522

[45] Date of Patent: Nov. 13, 1990

[54] POLYMER-COATED SUPPORT AND ITS USE AS SAND PACK IN ENHANCED OIL RECOVERY

[75] Inventors: Darrell D. Whitehurst, Titusville; Margaret M. Wu, Belle Mead, both of N.J.

[73] Assignee: Mobil Oil Corporation, New York, N.Y.

[21] Appl. No.: 288,334

[22] Filed: Dec. 21, 1988

[51] Int. Cl.$^5$ .................... E21B 43/04; E21B 43/12
[52] U.S. Cl. .................................. 166/278; 166/294; 166/295; 428/407; 523/131
[58] Field of Search ............... 166/276, 278, 280, 294, 166/295; 523/130, 131; 252/8.551; 427/220; 428/402.2, 403, 404, 407

[56] References Cited

U.S. PATENT DOCUMENTS

| | | | |
|---|---|---|---|
| 2,825,721 | 3/1958 | Hogan et al. | 526/106 |
| 3,026,938 | 3/1962 | Huitt et al. | 166/280 |
| 3,622,521 | 11/1971 | Hogan et al. | 526/100 X |
| 4,063,009 | 12/1977 | Ziegler et al. | 526/105 X |
| 4,231,428 | 11/1980 | Needham et al. | 166/280 |
| 4,660,642 | 4/1987 | Young | 166/278 X |
| 4,733,729 | 3/1988 | Copeland | 166/276 |
| 4,796,701 | 1/1989 | Hudson et al. | 166/280 X |
| 4,827,064 | 5/1989 | Wu | 585/10 |
| 4,827,073 | 5/1989 | Wu | 585/530 |
| 4,850,430 | 7/1989 | Copeland et al. | 166/276 |

*Primary Examiner*—George A. Suchfield
*Attorney, Agent, or Firm*—Alexander J. McKillop; Charles J. Speciale

[57] ABSTRACT

A non-friable support, e.g., sand, coated with a polymer is prepared by contacting the support containing a polymerization catalyst with a monomer which is at least one multi-functional olefin, e.g., a diene, under monomer polymerization conditions. The product of the polymerization process is a highly cross-linked coating which engulfs the support, thereby rendering it hydrolytically and thermally stable. The support can be used as a sand pack in enhanced oil recovery operations, wherein it is resistant to deterioration due to high temperature, pressure and alkaline conditions existing in the subterranean formations.

14 Claims, No Drawings

POLYMER-COATED SUPPORT AND ITS USE AS SAND PACK IN ENHANCED OIL RECOVERY

BACKGROUND OF THE INVENTION

I. Field of the Invention

This invention is directed to a polymer-coated support and its use as sand pack in enhanced oil recovery. The polymer is deposited on the support in situ by polymerizing a suitable monomer or monomers on the surface of the support containing a suitable polymerization catalyst deposited thereon.

II. Description of Related Art

One of the problems encountered in thermally-enhanced oil recovery operations is well degradation due to sand abrasion within the well caused by the co-production of the formation sand along with the oil. This is particularly troublesome in formations which consist of very fine, unconsolidated sand. A technique often used to protect the well from sand abrasion involves the introduction of a protective sand pack near the production zone by sequentially injecting graded sand and gravel to create a filtration medium which prevents the formation sand from entering the production well. The injected sand has a gradually increasing particle size, so that the finest sand is injected initially to be maintained at the bottom of the well, and the coarsest sand is injected last, to be maintained at the top of the sand pack. Unfortunately, in enhanced oil recovery processes, such as thermally-enhanced production, at the typical depth of 1000 feet at the corresponding high pressures and the temperatures of about 350° C. or higher, and at the alkaline conditions inherently existing in the formations, the protective sand of the sand pack slowly dissolves, the protective pack is lost and the well integrity deteriorates. As a result, the sand of the sand pack tends to break down into smaller particles and is co-produced with the oil.

To alleviate this problem, it has been proposed in the past to coat the sand with conventional polymers, such as polyethylene. However, polyethylene does not provide a stable coating at the temperatures encountered in thermally-enhanced oil production since such temperatures are higher than the melting point of polyethylene polymers and the temperature threshold of thermal stability of the polymers. Accordingly, polyethylene cannot be used to effectively protect the sand pack from corroding under the harsh conditions of the underground formation.

It is a primary object of the present invention to provide a hydrolytically- and thermally-stable material which can be used to protect a sand pack from the high temperature, pressure and alkalinity conditions inherently existing in underground formations.

Additional objects of the invention will become apparent to those skilled in the art from the following discussion thereof.

SUMMARY OF THE INVENTION

A polymer-coated, preferably highly-crosslinked polymer-coated, substantially non-friable support, such as sand, is prepared by depositing an olefin polymerization catalyst which is a chromium-containing or a chromium compound-containing catalyst (also known as a Phillips catalyst), a catalyst containing an oxide of a metal of Group VIB of the Periodic Chart of the Elements, such as tungsten oxide or molybdenum oxides, or a Ziegler catalyst, on the substantially non-friable support, and subsequently contacting the support with at least one multi-functional olefin monomer under polymerization conditions. As a result, a solid polymer surface is formed in situ on the non-friable support, and it effectively protects the support from the hostile environment of the underground oil formation. The thus-formed polymer-coated non-friable support is used as a sand pack in enhanced oil recovery operations.

DETAILED DESCRIPTION OF THE INVENTION

Support

Suitable supports used herein are any supports which are non-friable, i.e., they are not easily crumbled, pulverized or reduced to powder. Thus, suitable supports are non-friable silica, conventional sand, such as sand available commercially for use as sand packs, or, in some embodiments, silica gel. In a preferred embodiment, wherein the polymer-coated support is used as a sand pack, the support is a quartz-based, low surface area sand having the particle size or sizes which renders it suitable for use as a sand pack for a particular subterranean oil formation. The choice of a support having suitable size or sizes for such a utility can be easily determined by those skilled in the art.

If the support is sand, it should have a surface area less than 600 $m^2/g$, and surface OH groups which are used to support the polymerization catalyst on the surface in the manner known to those skilled in the art.

The non-friable support used herein can be used as such, or it can be treated to increase the concentration of surface hydroxyl groups by any suitable means, e.g., by etching the surface of the support with hydrofluoric acid (HF). Such a conventional, known treatment comprises contacting the support with a dilute aqueous HF solution, e.g., 3% by volume in water, at room temperature for a few minutes. Thus, the support used herein is dissimilar from that normally used heretofore as a solid, porous carrier for polymerization of alpha-olefins with Ziegler or Phillips catalysts in fluid bed reactors. The solid, porous carriers used for the catalysts in fluid bed reactors must be friable and they must have the ability to break into submicron particles during the polymerization process to provide sites for the growth of polymers. As discussed above, the support used in the present invention may not be friable and, once it is contacted with a monomer, it becomes engulfed in the polymer product which protects the surface of the support from the harsh conditions of underground formations.

Catalyst

The catalyst which is deposited onto the non-friable support is any olefin-polymerization catalyst known in the art, such as a chromium-containing or chromium compound-containing catalyst, a catalyst containing oxides of Group VIB metals, such as oxides of tungsten or molybdenum, or a Ziegler catalyst, i.e., a catalyst containing a transition metal compound, such as titanium, vanadium or zirconium, a catalyst activator and usually a magnesium compound.

The Phillips catalyst (chromium-containing or chromium compound-containing catalyst) which can be used in this invention is any such known catalyst, such as that disclosed by Hogan et al, U.S. Pat. Nos. 2,825,721 and 3,622,521, the disclosures of which are incorporated herein by reference. Such a catalyst contains one or more of a variety of chromium compounds, such as $CrO_3$, chromium nitrate, chromium carbonate, chromium acetate, ammonium chromate, chromium chloride, tertiary butylchromate, chromium acetylacetonate and chromium sulfate. The Phillips catalyst may also contain a titanium compound, such as any of the titanium compounds oxidizable to titanium dioxide ($TiO_2$) under the catalyst activation conditions, e.g., those disclosed by Hogan et al, U.S. Pat. No. 3,622,521, and Netherlands Patent Application No. 72-10881, incorporated in its entirety by reference herein. The Phillips catalyst may also be the catalyst of Hsieh et al, U.S. patent application Ser. No. 111,944, filed on Oct. 21, 1987, incorporated herein by reference in its entirety.

One particularly preferred Phillips catalyst is that disclosed in two co-pending U.S. patent applications of Wu, Ser. Nos. 210,434 and 210,435, both filed on June 23, 1988, the contents of both of which are incorporated herein by reference. The synthesis of this catalyst, also referred to herein as the catalyst of Wu, is summarized below.

The catalyst of Wu comprises a lower valence Group VIB metal oxide on the support utilized in this invention. Preferred support for the synthesis of this catalyst has a pore opening of at least 40 Angstroms. Such a preferred support for the catalyst of Wu usually has high surface area and large pore volumes with average pore size of about 40 to about 350, preferably about 60 to about 300 Angstroms. The high surface area is beneficial for supporting a large amount of highly dispersive, active Group VIB metals centers and to give maximum efficiency of metal usage, resulting in a very high activity catalyst.

The catalyst of Wu is preferably prepared by impregnating the salts of metals of Group VIB in water or organic solvents onto the support. Any suitable organic solvent known in the art may be used, for example, ethanol, methanol, or acetic acid. The thus-obtained solid catalyst precursor is then dried and calcined at about ambient temperature to about 900° C. in air or other oxygen-containing gas. Thereafter, the catalyst is reduced by any of several well known reducing agents, such as CO, $H_2$, $NH_3$, $H_2S$, $CS_2$, $CH_3SCH_3$, metal alkyl-containing compounds, such as $R_3Al$, $R_3B$, $R_2Mg$, RLi, $R_2Zn$, where R is alkyl, alkoxy or aryl. Preferred reducing agents are CO, $H_2$ or metal-alkyl containing compounds.

Alternatively, the Group VIB metal may be applied to the support in a reduced form, such as Cr(II) compounds. The resulting catalyst of Wu is very active for polymerizing olefins in the process of this invention at a temperature of from below room temperature to about 250° C. at a pressure of 0.1 atmosphere to 5000 psi. Contact time of both the olefin and the catalyst can vary from one second to 24 hours.

In one particularly preferred embodiment of the synthesis of the catalyst of Wu, the support is added to a solution of a chromium compound, e.g., chromium acetate or nitrate, in one of the aforementioned solvents and the mixture is then mixed and dried at room temperature. The dry solid gel is purged at successively higher temperatures to about 600° C. for a period of about 16 to 20 hours. Thereafter the catalyst is cooled under an inert atmosphere to a temperature of about 250° to 450° C. and it is then contacted with a stream of a pure reducing agent for a sufficient time to reduce the catalyst as indicated by a distinct color change from bright orange to pale blue. Typically, the catalyst is treated with an amount of CO (a reducing agent) equivalent to a two-fold stoichiometric excess to reduce the catalyst to a lower valence Cr(II) state. Finally, the catalyst is cooled down to room temperature and it is ready for use.

In another preferred embodiment of the catalyst of Wu, a chromium compound, such as $CrO_3$, chromium (III) acetate or organochromium compounds, such as chromocene (dicyclo-pentadienyl chromium) is impregnated onto the surface of the non-friable support. The chromium compound may be deposited onto the support in any conventional known manner. Thus, in one embodiment, the chromium compound in water or in an appropriate organic solvent can be impregnated onto the carrier surface by contacting the solution of the chromium compound with the support. The solid is then calcined under flowing air at a temperature of 500° to 800° C. for a sufficiently long time to convert the chromium compound into hexavalent chromium (Cr(VI)) and bind it onto the support. The supported catalyst is then reduced with a suitable reagent, such as carbon monoxide or hydrogen, at a suitable temperature, e.g., 350° C., to convert the chromium to lower oxidation states. The resulting, supported catalyst composition is an active olefin polymerization catalyst.

The Ziegler catalyst used herein is any well-known Ziegler catalyst. As is known to those skilled in the art, such catalysts comprise a catalyst precursor combined with a co-catalyst, also known as a catalyst activator, necessary to provide activity to the catalyst. The catalyst precursor is any one of the well-known to those skilled in the art Ziegler catalyst precursors comprising a transition metal or a compound thereof, e.g., titanium trichloride or titanium tetrachloride. The catalyst precursor also usually comprises a magnesium compound, e.g., a Grignard reagent. Suitable precursors are disclosed by Karol et al, U.S. Pat. No. 4,302,566, Nowlin et al, U.S. Pat. No. 4,481,301, Goeke, U.S. Pat. No. 4,354,009, Strobel et al, U.S. Pat. No. 4,148,754 and Ziegler, deceased et al, U.S. Pat. No. 4,063,009, the entire contents of all of which are incorporated herein by reference. Suitable activators for the Ziegler catalyst precursor are aluminum alkyls and aluminum alkyl hydrides, such as those disclosed by Stevens et al, U.S. Pat. No. 3,787,384, column 4, line 45 - column 5, line 12, and by Strobel et al, U.S. Pat. No. 4,148,754, column 4, line 56 - column 5, line 59, the entire contents of both of which are incorporated herein by reference. Specific examples of some suitable activators are triethylaluminum, trimethylaluminum, triisobutylaluminum, diisobutylaluminum hydride, tri-n-hexylaluminum, ethylaluminum dichloride, dibromide, and dihydride, isobutylaluminum dichloride, dibromide and dihydride, diethylaluminum chloride, bromide and hydride, di-n-propylaluminum chloride, bromide and hydride, diisobutylaluminum chloride, bromide and hydride, tetramethyl germanium, and tetraethyl germanium. It will be apparent to those skilled in the art that the catalyst activator may be combined with the catalyst precursor, previously deposited on the non-friable support, by adding the activator to the support after the precursor had been deposited thereon, but prior to the contact of the supported catalyst with a monomer. Alternatively, the activator may be added to the supported precursor together with the monomer.

A preferred Ziegler catalyst comprises a high activity Ziegler catalyst precursor containing a magnesium compound, e.g., magnesium dichloride ($MgCl_2$), and a titanium compound, e.g., titanium trichloride (TiCl$_3$), and one of the aforementioned activators. Such a catalyst is impregnated onto the support, for example, by slurrying the support with a solution of a solvent containing TiCl$_3$ and MgCl$_2$, and then drying off the solvent. Suitable solvents are tetrahydrofuran (THF) or other known solvents for a transition metal compound (e.g., TiCl$_3$) and a magnesium compound (e.g., MgCl$_2$), such as dialkylethers, toluene, acetonitrile, carbon disulfide, methylene chloride or chloroform.

Monomer

The monomers used in the present invention are any multi-functional olefin monomers having two or more terminal olefin groups which can be polymerized or cross-linked in the presence of the catalyst used in the invention. The term "multi-functional olefin monomers", also referred to herein as multi-functional olefins, as used herein designates monomers having at least two terminal olefin linkages within a single molecule, e.g., dienes. Mixtures of such multi-functional olefins and mixtures of multi-functional olefins with small amounts of at least one monoolefin may also be used. Suitable monoolefins used in such mixtures are ethylene, propylene, 1-pentene, 1-hexene, 1-octene, 1-decene, 1-undecene, 1-dodecene, or mixtures thereof. The amount of the monoolefin in the mixture is less than 10, and preferably less than 5% by weight (% wt.), based on the total weight of the mixture. Preferred multi-functional olefins are di-olefins, such as 1,3-butadiene, 1,4-pentadiene, 1,5-hexadiene, 1,6-heptadiene, 1,7-octadiene, 1,8-nonadiene, 1,9-decanediene, or mixtures of dienes, such as those that result from metathesis of cyclic olefins with ethylene, or any mixtures of the above di-olefins. The metathesis of cyclic olefins with ethylene is conducted in a conventional manner, known to those skilled in the art.

The supported catalyst is contacted with the monomer under conventional polymerization conditions, such as the temperature of about −30° C. to about 250° C., preferably about 20° C. to about 200° C., at a pressure of between ambient up to 3000 psi and for a sufficient time to polymerize at least 1% of the monomer reactant. The resulting polymers are highly cross-linked and highly thermally stable. Accordingly, they are able to withstand the high temperature, high pressure, alkaline conditions within the wellbore, such as those encountered in steam flooding, without breaking down and allowing the foundation sand to be produced together with the oil from the subterranean formation. The support with the polymer cross-linked thereon is injected in the usual manner into the oil well to act as a sand pack preventing the production of the formation sand with the oil. The polymer product of the polymerization reaction of the present invention is a solid which has a relatively high melting point, e.g., about 200° C. to about 400° C., and it is not water soluble at high temperatures, e.g., about 200° to about 400° C. The polymer-coated support preferably has a density of greater than about 1 g/cc, yet more preferably greater than about 1.2 g/cc. This product is dissimilar from the products of the polymerization reaction of monomers, such as alpha-olefins, with Ziegler or Phillips catalysts supported on solid, porous carriers, in fluid bed or in slurry reactors, since the polymer products produced in such reactors are normally not cross-linked, and they have relatively low melting points, e.g., about 90° to about 150° C.

The following examples further illustrate the essential features of the invention. However, it will be apparent to those skilled in the art that the specific reactants and reaction conditions used in the examples do not limit the scope of the invention.

EXAMPLE 1

(Cr - Containing Catalyst Preparation and Activation Procedure)

1.9 grams of chromium (II) acetate (Cr$_2$(OCOCH$_3$)$_4$2H$_2$O) (5.58 mmole), commercially obtained, is dissolved in 50 cc of hot acetic acid. Then, 50 grams of a silica gel of 8-12 mesh size, a surface area of 300 m$^2$/g, and a pore volume of 1 cc/g, is also added. Most of the solution is absorbed by the silica gel. The final mixture is mixed for 30 minutes on a rotavap at room temperature and dried in an open dish at room temperature. First, the dry solid (20 g) is purged with N$_2$ at 250° C. in a tube furnace. The furnace temperature is then raised to 400° C. for 2 hours. The temperature is then set at 600° C. with dry air purging for 16 hours. At this time, the catalyst is cooled down under N$_2$ to a temperature of 300° C. Then, a stream of pure CO (99.99% from Matheson) is introduced for one hour. Finally, the catalyst is cooled down to room temperature under N$_2$ and it is ready for use.

EXAMPLE 2

(Polymerization of 1,7-Octadiene)

80 grams (g) of 1,7-octadiene was polymerized at 130° C. with 4 g of the catalyst synthesized substantially in the manner of the catalyst of Example 1. The polymerization was conducted for 16 hours and under a positive purified nitrogen atmosphere to exclude any air or moisture, which act as poisons for the catalyst. After 16 hours, a granular solid material was recovered quantitatively. The solid mass was purified by washing with about 100 cc of heptane and then dried in air. The solid had the following composition: 79.31% C; 11.77% H; 3.93% Si; and 0.076% Cr. The product was a solid polymerized mass, supported on the silica gel. Thermal stability of the polymerized mass was tested in a conventional capillary melting apparatus. The test indicated that the polymer product was thermally stable and did not melt even at 280° C.

It will be apparent to those skilled in the art that the specific embodiments discussed above can be successfully repeated with ingredients equivalent to those generically or specifically set forth above and under variable process conditions.

From the foregoing specification, one skilled in the art can readily ascertain the essential features of this invention and without departing from the spirit and scope thereof can adapt it to various diverse applications.

We claim:

1. A method of recovering oil substantially without producing silica-containing material from a subterranean oil formation comprising penetrating the formation with at least one well from which the oil is produced, depositing at the bottom of the well a sand pack prepared by depositing an olefin polymerization catalyst which is a Group VIB metal-containing catalyst or a Ziegler catalyst on a substantially non-friable support and subsequently contacting the support with at least one multi-functional olefin monomer under polymerization conditions, thereby forming a solid, polymer surface on the support, placing the support having the solid, polymer surface in the well to form said sand pack and recovering the oil from the well.

2. A method of claim 1 wherein the Group VIB metal-containing catalyst is a chromium-containing catalyst.

3. A method of claim 1 wherein the olefin monomer is a multi-functional olefin, or a mixture of a multi-functional olefin with not more than 10% by weight of a mono-olefin.

4. A method of claim 3 wherein the multi-functional olefin is a di-olefin.

5. A method of claim 3 wherein the di-olefin is 1,3-butadiene, 1,4-pentadiene, 1,5-hexadiene, 1,6-heptadiene, 1,7-octadiene, 1,8-nonadiene or 1,9-decadiene.

6. A method of claim 5 wherein the mono-olefin is ethylene, propylene, 1-pentene, 1-hexene, 1-octene, 1-decene, 1-undecene, 1-dodecene or mixtures thereof.

7. A method of claim 5 wherein the di-olefin is 1,7-octadiene.

8. A method of claim 7 wherein the catalyst is a chromium-containing catalyst.

9. A method of claim 8 wherein the catalyst contains chromium trioxide and a titanium compound.

10. A method of claim 9 wherein the non-friable support is silica.

11. A method of claim 9 wherein the non-friable support is sand.

12. A method of claim 11 wherein the sand, prior to the deposition of the catalyst thereon, is treated by contacting it with a dilute aqueous solution of hydrofluoric acid.

13. A method of claim 8 wherein the chromium-containing catalyst is synthesized by contacting a silica gel of 8–12 mesh size, a surface area of 300 $m^2/g$ and a pore volume of 1 cc/g, with a solution of chromium acetate in acetic acid.

14. A method of claim 2 wherein the substantially non-friable support is silica, sand, quartz-based low surface area sand or silica gel.

* * * * *